July 31, 1962 J. S. KURTZ 3,046,940
ROLL-A-WAY NEST
Filed Dec. 27, 1960

INVENTOR.
JOHN S. KURTZ
BY
*Price & Heneveld*
ATTORNEYS

United States Patent Office 3,046,940
Patented July 31, 1962

3,046,940
ROLL-A-WAY NEST
John S. Kurtz, Ephrata, Pa., assignor to Automatic Poultry Feeder Company, Zeeland, Mich., a corporation of Michigan
Filed Dec. 27, 1960, Ser. No. 78,625
6 Claims. (Cl. 119—48)

This invention relates to housing structures, and more particularly to a nest construction for egg-laying fowl.

The application of modern sanitation standards and mass production techniques to egg production have caused nests from which laid eggs are automatically removed to become increasingly important. In the simplest and one of the most desirable form of such a nest, the bottom support upon which the fowl rests and lays the egg is slanted toward the front or back of the nest to obtain a roll-a-way feature for simple removal of the eggs. The adaption of the ordinary smooth bottom of customary nests to the slanted position has not been satisfactory since a slanted smooth bottom creates a slippery footing condition for somewhat awkward fowl such as chickens. This poor footing characteristic prevents fowl from being at ease and thus reduces their egg laying rate. If conventional straw or the like is inserted it merely slides with the bird, and is furthermore not readily adaptable to sanitary and high production conditions. Indeed, such materials involve a constant replenishing and cleaning problem.

Therefore, it has become exceedingly desirable to obtain a nest construction which would supply the roll-a-way feature, would also allow the fowl to maintain proper footing for optimum egg laying yields, could be readily and thoroughly cleaned to meet modern cleanliness standards, would be simple to fabricate, would possess the proper contour of a nest, would be inexpensive to manufacture and would be simple to construct.

Therefore, it is an object of this invention to satisfy the above need and to provide a unique, inexpensive, simple, readily assembled and sanitary roll-a-way nest that will optimize the laying rate by utilizing a special nest bottom insert.

These and other objects of this invention will be apparent upon a perusal of the following specifications when taken in conjunction with the drawings in which.

Basically, the nest construction of this invention comprises an insert and its cooperating chamber or housing. The insert includes a layer of relatively stiff wire mesh, preferably plastic coated, which is attached to an underlying layer of stiff sheet material, preferably metal, by lateral flanges on the sheet material. Both the wire mesh and the metal insert are contoured to that of a natural nest. The wire mesh provides good footing characteristics and roll-a-way properties for the eggs to be laid while the underlying sheet material provides contour, and serves as a receptacle for dirt and manure which falls through the woven wire mesh material. The combined wire layer and base layer are together supported within the lower portion of a nest chamber by an elongated rod member or the like at one end, and by the resting of a portion of the wire layer on a slot ledge in the end wall of the chamber on the other end.

Figure 1:
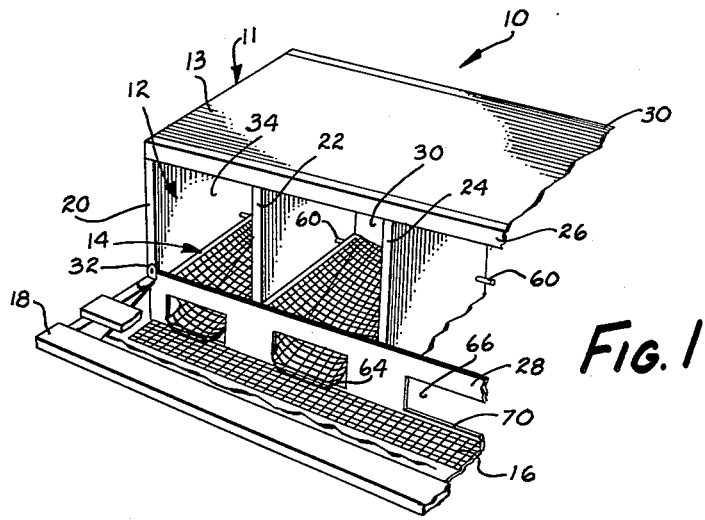
FIG. 1 is a fragmentary perspective view showing a group of the novel egg nests.

Referring now to FIG. 1, nest 10 includes housing 11 which possesses a plurality of individual chambers 12, and an optional perch 18. Within each chamber 12 and cooperating therewith is an insert 14 having roll-a-way characteristics and providing a bottom for the nest chamber. The inserts in the nests are identical and interchangeable. A plurality of one-layered groups of nests may be stacked one above the other if desired, with the inserts 14 forming the bottom of the upper nest and the top of a lower nest. A top cover 13 is secured to the uppermost layer. Of course, such a top is not needed for the nests below the uppermost layer. Housing 12 may be fabricated in conventional manner by bolting or welding side panel walls 20, 22 and 24 to front panel walls or braces 26 and 28 and rear enclosing panel wall 30. Although the two ends of this housing are referred to as the front and rear, it will be obvious that the roll-a-way feature and the insert mounting means may readily be reversed with respect to the fowl inlet opening and perch. Perch 18 is mounted upon the front of the housing by suitable means such as hinges 32.

Figure 4:
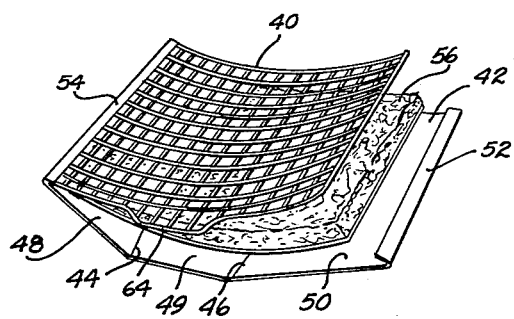
FIG. 4 is a perspective view of the bottom insert utilized in the nest.

The insert 14 shown in detail in FIG. 4 is composed of a layer of relatively stiff wire mesh 40 which is preferably coated with a suitable plastic material, and a stiff sheet of underlying material. The exact composition of the plastic material is not critical as long as it may be readily cleaned and possesses sufficient softness to allow an egg to roll thereover without breakage. The wire mesh is preferably stiff enough to be self-supporting and is formed with a contour like that of a natural nest, before it is coupled with the underlying similarly contoured sheet material 42, preferably of metal. This metal sheet, as well as the wire mesh, is bent along two divergent lines 44 and 46 to provide side portions 48 and 50 which are oriented at an obtuse angle with respect to the central portion 49. This particular shape provides a desirable nest bottom contour and also facilitates the smooth rolling of a laid egg out of the nest as will be explained more fully hereinafter. The mesh and sheet layers are secured together in a sliding fit by U-shaped lateral flanges 52 and 54 on the sheet material. A clearance preferably remains between the assembled wire mesh and sheet material layers so that the sheet layer can collect refuse from the mesh layer.

If desired, a layer of shredded vegetable or other fibrous material 56 may be sandwiched between the sheet metal layer and the wire mesh layer to provide a camouflage material. This enables the fowl to become accustomed to this modernized equipment, after which the fibrous material may be removed.

Figure 2:
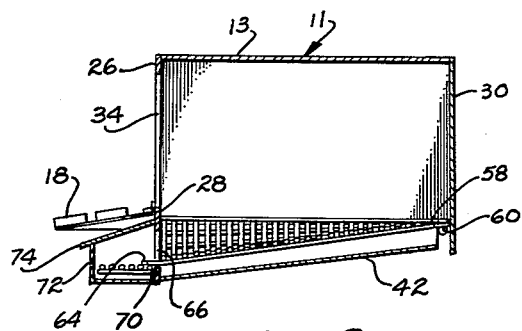
FIG. 2 is an end view of one of the nests shown in FIG. 1.
Figure 3:
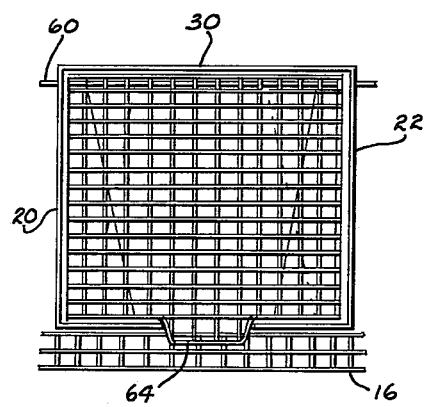
FIG. 3 is a top view of one of the nests shown in FIG. 1.

After the insert shown in FIG. 4 has been completely assembled with or without the fibrous layer, it is placed within chamber 12. The rearward edge of the wire mesh layers preferably extends beyond the sheet metal layer so that this edge 58 rests upon an elongated rod 60 which is inserted through the side walls of the housing 11 and extends through the rearward end of all of the adjacent nest chambers. The positioning of the insert on this rod is clearly shown in FIG. 2. It is obvious that such a construction is very simple but effective. The front of the insert is supported by the cooperation of a tongue portion 64 on the mesh layer which protrudes through opening 66 in panel 28. This tongue 64 rests upon lower edge or ledge 70 of opening 66. The sheet metal layer is suspended from the mesh layer as shown in FIG. 2. In FIG. 3, the assembled unit resting upon the bar and the opening ledge is clearly shown.

Insert 14 is placed within chamber 12 in a slanting position as shown in FIGS. 1 and 2. This slant toward opening 66, which is large enough to allow an egg to pass through, causes eggs laid in the nest to immediately roll out onto collecting egg tray 16 in a front or rear roll-a-way nest. The diverging edges 48 and 50 of the sheet layer, and the assembled mesh layer, cause any eggs to be laid thereon to roll to the central portion 49, from whence they roll onto tongue 64 and onto egg tray 16. This egg tray is also preferably a wire mesh material with a plastic coating thereon. Housing 72 around tray 16 retains collected eggs on the tray, and may possess a hinged cover 74 for removal of the eggs. If the perch 18 is located on the same end of housing 11 as this egg tray, the perch should be mounted upon hinges to allow removal of the eggs. If desired, the elongated egg tray may be placed on a slant to cause the eggs to roll to one end.

Due to the slanted position of insert 14 within each chamber, this insert must provide good footing for optimum laying conditions. The wire mesh fills this requirement very well. Further, the plastic coating on the mesh allows an egg to roll out without being damaged. The sheet metal catches all droppings and dirt thus preventing them from falling to a nest below, and facilitating easy cleaning of the nest. When cleaning the nests, inserts 14 are merely removed by lifting them from their supports, and then washed or steamed in any suitable manner.

Due to their uniformity of dimensions and simplicity in assembling, any desired number of these nests may be quickly and cheaply assembled into a unit by attaching a series of front and back support panels to a plurality of spaced side walls, inserting support rod 60 through the back of the several nest chambers, sliding the mesh layer within the sheet metal flanges with or without a fibrous layer, inserting the extending mesh tongue through the roll-a-way slot for support on its ledge, and then allowing the other end of the unit to rest on the bar support.

Thus there are provided a novel and unique nest and nest insert which are inexpensive to manufacture, readily assembled, easily replaced, very simple in construction, easily, thoroughly and cheaply cleaned, provide continuous egg removal, assure removal of the eggs without damage, abrogate the need for conventional troublesome nest bottoms, provide the proper footing to a slanted roll-a-way type nest, and simply and effectively provide the desired nest contour.

It will be obvious to those having ordinary skill in the art that various modifications may be made of the illustrated structure without departing from the true spirit of the invention. These include slight changes in the means of support, for example. These modifications are intended to be included within this invention, such invention being limited only by the definitions contained in the attached claims and the reasonable equivalents thereto.

I claim:

1. A nest for fowl comprising: a nest housing having a plurality of compartments each with support means for separately supporting bottom inserts; a removable insert in each of said compartments and supported on said support means forming the complete bottom for an egg laying fowl nest comprising in combination a layer of wire mesh material adapted to support a laying fowl and to receive eggs laid directly thereon when inserted into a nest housing; a contoured layer of stiff sheet material underlying said wire mesh and attached to the edges of said wire mesh; said sheet material and said wire mesh both having a generally concave contour to fit the underside of a laying fowl; said sheet material being suspended from said mesh and generally spaced therefrom to catch dirt passing through said wire mesh; said sheet material and wire mesh being removable from said housing as a unit and being thereafter separable from each other to permit cleaning.

2. The insert of claim 1 wherein a layer of fibrous material is sandwiched between said mesh layer and said sheet material layer and is supported on said sheet material layer; said mesh, sheet material layer, and fibrous material comprising an insertable and removable unit forming a complete nest bottom.

3. The insert in claim 1 wherein said wire mesh is contoured by having a centrally depressed portion and upwardly divergent side portions; and wherein said layer of sheet material attached to said wire mesh also includes a depressed central portion and upturned divergent side portions terminating in an attachment to said wire mesh.

4. The insert in claim 3 wherein the side edges of said sheet material has wire mesh retaining means to form an attachment with said mesh; and wherein said wire mesh has a sufficient width to cause it to be depressed in its central portion when secured between said retaining means to thus provide a contoured nest.

5. The insert in claim 4 wherein one end of said wire mesh centrally depressed portion has an extending tongue portion adapted to support said mesh and sheet material in said nest housing and to supply egg exit means.

6. The insert in claim 4 wherein said retaining means comprises a facing, generally U-shaped retaining flanges on the side edges of said sheet material capable of slidably receiving the contoured wire mesh.

References Cited in the file of this patent
UNITED STATES PATENTS

| | | |
|---|---|---|
| 2,623,499 | King | Dec. 30, 1952 |
| 2,676,566 | Krieger | Apr. 27, 1954 |
| 2,765,772 | Inman | Oct. 9, 1956 |
| 2,765,773 | Gruel | Oct. 9, 1956 |
| 2,766,724 | Tarbuck | Oct. 16, 1956 |
| 2,956,539 | Boening | Oct. 18, 1960 |